US008231222B2

(12) United States Patent
Barnes et al.

(10) Patent No.: US 8,231,222 B2

(45) Date of Patent: Jul. 31, 2012

(54) HELIOSTAT WITH ACTIVELY CONTROLLED LIQUID BALLAST SYSTEM

(75) Inventors: Timothy Barnes, Ammon, ID (US); Warren Ostergren, Socorro, NM (US); David Petersen, Albuquerque, NM (US); Robert Slingsby, Santa Fe, NM (US)

(73) Assignee: New Mexico Technical Research Foundation, Socorro, NM (US)

( * ) Notice: Subject to any disclaimer, the term of this patent is extended or adjusted under 35 U.S.C. 154(b) by 537 days.

(21) Appl. No.: 12/338,199

(22) Filed: Dec. 18, 2008

(65) Prior Publication Data

US 2009/0095281 A1 Apr. 16, 2009

(51) Int. Cl.
*G03B 21/00* (2006.01)

(52) U.S. Cl. ......... 353/3; 353/119; 353/122; 248/205.1; 248/122.1

(58) Field of Classification Search ...... 353/3; 126/696, 126/684, 623, 906, 438, 573, 579, 593, 600, 126/604, 680, 688; 248/205.1, 122.1, 123.11, 248/125.8, 188.6, 188.7, 166; 359/849, 853, 359/859; 250/203.4

See application file for complete search history.

(56) References Cited

U.S. PATENT DOCUMENTS

| | | | | |
|---|---|---|---|---|
| 2,999,943 | A | 9/1961 | Geer | |
| 3,861,379 | A * | 1/1975 | Anderson, Jr. | 126/577 |
| 4,175,391 | A | 11/1979 | Baer | |
| 4,198,954 | A * | 4/1980 | Meijer | 126/579 |
| 4,227,513 | A * | 10/1980 | Blake et al. | 126/578 |
| 4,247,182 | A * | 1/1981 | Smith | 353/3 |
| 4,256,088 | A * | 3/1981 | Vindum | 126/571 |
| 4,275,712 | A | 6/1981 | Baer | |
| 4,306,541 | A * | 12/1981 | Morrison et al. | 126/580 |
| RE30,961 | E | 6/1982 | Robbins | |
| 4,620,771 | A * | 11/1986 | Dominguez | 359/591 |
| 4,765,309 | A | 8/1988 | Legge | |
| 5,325,844 | A * | 7/1994 | Rogers et al. | 126/605 |
| 5,645,248 | A * | 7/1997 | Campbell | 244/30 |
| 5,758,938 | A * | 6/1998 | Osterwisch | 353/3 |
| 6,702,050 | B1 * | 3/2004 | Mazhar | 180/10 |
| 7,156,088 | B2 * | 1/2007 | Luconi | 126/696 |
| 2004/0112373 | A1 | 6/2004 | Djeu | |
| 2007/0012311 | A1 | 1/2007 | Yi et al. | |

* cited by examiner

*Primary Examiner* — Georgia Y Epps

*Assistant Examiner* — Sultan Chowdhury

(74) *Attorney, Agent, or Firm* — Robert Becker; Robert Becker & Associates

(57) ABSTRACT

A heliostat having a frame structure for supporting a mirror. The frame structure is pivotable about at least one axis of rotation. A liquid ballast system is mounted on a side of the frame structure that is remote from the reflective surface of the mirror. The liquid ballast system includes at least two tanks, and an imaginary line between the tanks extends at an angle or perpendicular to the axis of rotation. An arrangement is provided for moving ballast liquid between the tanks in an actively controlled manner.

17 Claims, 6 Drawing Sheets

HELIOSTAT WITH ACTIVELY CONTROLLED LIQUID BALLAST SYSTEM

BACKGROUND OF THE INVENTION

The present invention relates to a heliostat that is provided with an actively controlled liquid ballast system.

With rising concerns about the limited supply and environmental impact of fossil fuels, much attention is being given to the development of clean, renewable energy sources. The heliostat array concept is one of the more promising of such sources. A heliostat is comprised of a large mirror and the machinery and instrumentation necessary to actuate the mirror such that it can reflect sunlight onto a stationary target throughout the day. A heliostat array is created by disposing a large number of heliostats around a central receptor such that they concentrate sunlight on the receptor. The heat produced by this concentration of sunlight may be used in any number of ways, for example to drive a steam turbine power unit and generate electricity. Very accurate continuous positioning systems are needed for the mirrors. Unfortunately, the prior known systems are expensive and complicated. For example, most conventional heliostats employ large servo motors geared down through a planetary-type transmission to effect the necessary rotation of their axes of rotation.

It is therefore an object of the present application to provide an economical heliostat that operates in a straightforward yet accurate manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The heliostat of the present application comprises a frame structure for supporting a mirror, wherein the frame structure is adapted to be pivotable about at least one axis of rotation. A liquid ballast system is mounted on a side of the frame structure that is remote from a reflective surface of the mirror. The liquid ballast system is comprised of at least two tanks to contain the ballast liquid, plus a means for moving ballast liquid between the tanks in an actively controlled manner. An imaginary line between the tanks extends at an angle, and may be perpendicular, to the axis of rotation.

Pursuant to one specific embodiment of the present invention, the frame structure can include a first support ring that it is pivotable about a first axis of rotation, and a second support ring for supporting the mirror. The second support ring is pivotably supported on the first support ring so as to be pivotable about a second axis of rotation that is perpendicular to the first axis of rotation. The liquid ballast system is mounted on a side of the second support ring that is remote from the reflective surface of the mirror. In this embodiment, the liquid ballast system is comprised of four tanks, wherein an imaginary line between one pair of opposing tanks is perpendicular to the first axis of rotation, and a further imaginary line between the other pair of opposing tanks is perpendicular to the second axis of rotation.

Further specific features and advantages of the present application will be described in detail subsequently.

Description of Specific Embodiments

Figure 1:
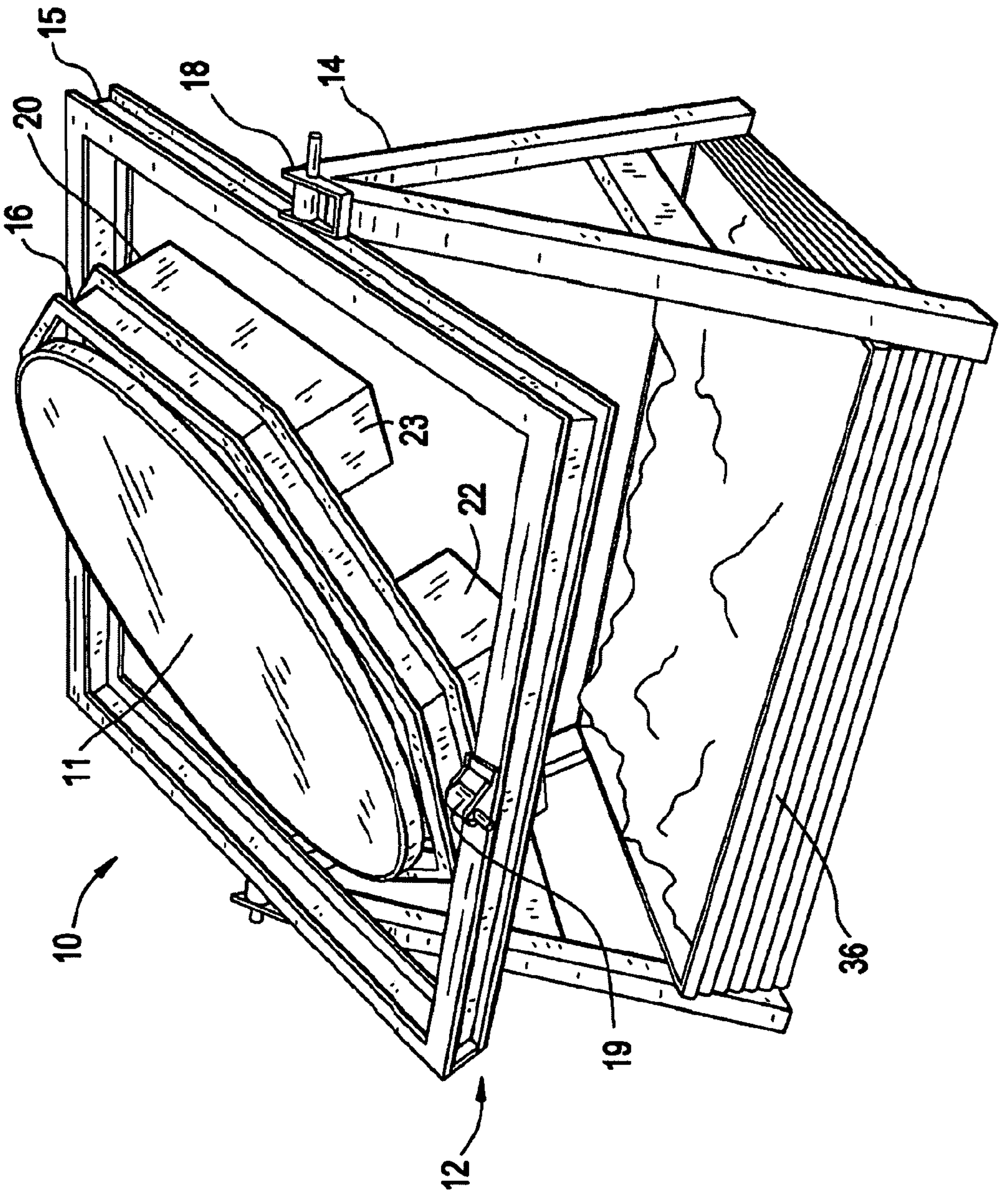
FIG. 1 is a perspective view showing one exemplary embodiment of the heliostat of the present application.

Referring now to the drawings in detail, FIG. 1 shows an overview of one exemplary embodiment of a heliostat having an actively controlled liquid ballast system pursuant to the present application, with the heliostat being designated generally by reference numeral 10.

The heliostat 10 of FIG. 1 schematically illustrates a presently preferred embodiment, and provides for movement of the mirror 11 about two axes of rotation, as will be explained in detail subsequently. As mentioned previously, a heliostat is a device for reflecting sunlight onto a stationary target throughout the day. The key functional component of the heliostat is a large mirror, which may be square, circular or polygonal in shape, and which may have either a flat or parabolic surface geometry. Pursuant to one embodiment of the present design, a ten-foot diameter stretched-membrane mirror facet was utilized. A stretched-membrane mirror is comprised of a rigid steel hoop having very thin sheets of steel bonded to both its upper and lower surfaces parallel to the plane of the hoop. Thin glass mirrors are then bonded to the outer surface of one of the sheets. By drawing a slight vacuum in the interior of the hoop, a parabolic curvature can be induced in the overlying steel sheet and the reflective surface mounted thereupon, with the focal length of the parabola being inversely proportional to the strength of the vacuum. Thus, the stretched-membrane mirror provides a parabolic reflective surface having a focal length that can be adjusted at will by regulating the vacuum pressure supplied to the mirror. It is to be understood that while use of a stretched-membrane mirror may be advantageous, any conventional mirror type could be utilized with the heliostat of the present application.

Figure 2:
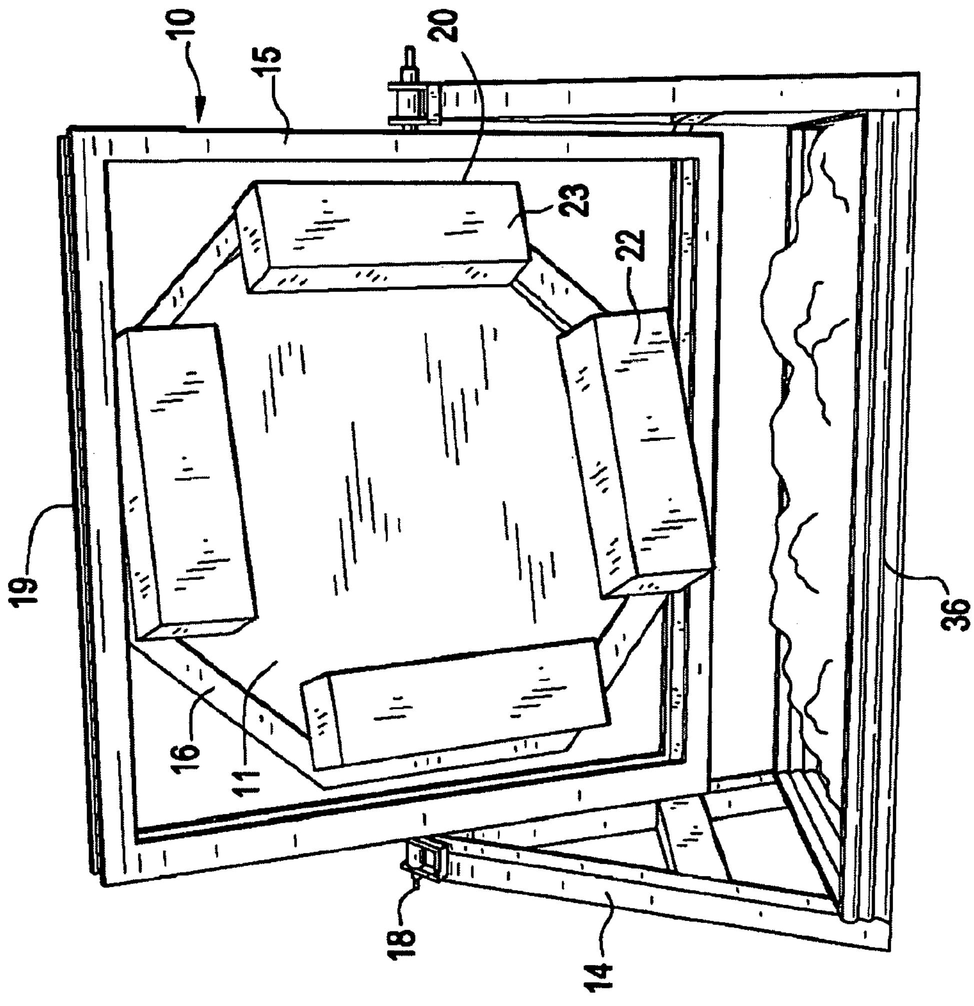
FIG. 2 is a perspective view from the rear shoving the liquid ballast system of the heliostat of FIG. 1.

Referring again to FIG. 1, the mirror 11 is mounted on a frame structure 12, which in the embodiment illustrated in FIGS. 1 and 2 comprises a base 14 and two concentric, so-called support rings 15 and 16. The outer support ring 15 is pivotably mounted on the base 14, and the inner support ring 16, which supports the mirror 11, is in turn pivotably mounted on the outer support ring 15.

The pivotable mounting of the outer support ring 15 on the base 14 is effected, for example, by the rods or axles 18 which are pivotably mounted on the base 14, such as in roller bearings. The outer support ring 15 is then supported on the rods or axles 18, which are disposed in a first axis of rotation. The inner support ring 16 is similarly pivotably mounted on the outer support ring 15 via the rods or axles 19, which can again be supported in roller bearings on the outer support ring 15. The rods or axles 19 are disposed in a second axis of rotation. The mirror 11 thus has two angular degrees of freedom, wherein in this embodiment the second axis of rotation of the inner support ring 16 extends perpendicular to the first axis of rotation of the outer support ring 15. It is to be understood that the rods or axles could be pivotably mounted in either, or both, of the appropriate base or outer support ring, and their respective ring.

To bring about appropriate rotation about the first and second axes of rotation of the outer support ring 15 and the inner support ring 16 respectively, and hence to achieve a proper and accurate orientation of the mirror 11, a liquid ballast system 20 is provided. In the illustrated embodiment, the liquid ballast system 20, which provides a continuous positioning system, includes two pairs of diametrically oppositely disposed tanks 22 and 23 for holding ballast liquid, such as, by way of example only, water which can also contain an additive such as ethylene glycol to prevent the water from freezing during cold-climate operation and to mitigate corrosion of metallic components that are exposed to the ballast liquid. Any other suitable liquids and/or additives could also be used.

The tanks 22 and 23 are mounted on the underside of the inner support ring 16, and in particular such that an imaginary line between one pair of opposing tanks is perpendicular to the first axis of rotation of the outer support ring 15 while a further imaginary line between the other pair of opposing tanks is perpendicular to the second axis of rotation of the inner support ring 16.

Figure 2A:
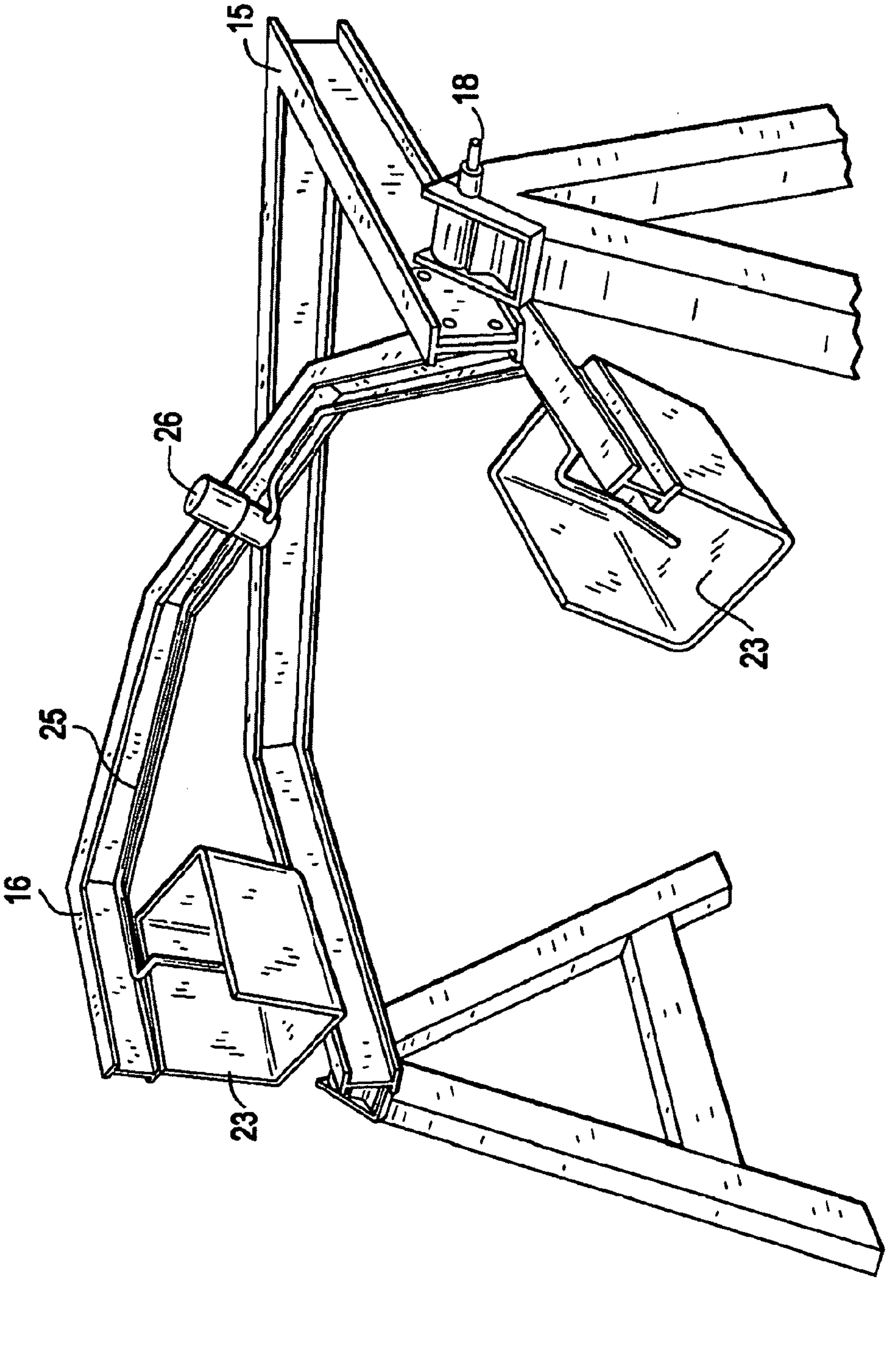
FIG. 2*a* is a cut away view illustrating how the ballast liquid tanks of the heliostat operate.

One exemplary construction of the liquid ballast system 20 can be seen more clearly from the cut away view of FIG. 2*a*. Shown here only are the two oppositely disposed tanks 23 for effecting rotation of the inner support ring 16 about its axis of rotation. The configuration and operation of the other two oppositely disposed tanks 22 would be comparable.

The tanks 23 are connected by tubing or other appropriate conduits 25 to a ballast pump 26, such as a reversible lobe pump, a centrifugal pump, a positive-displacement pump, or the like, which can move liquid from one tank 23 to the other tank 23, or vice versa. It is to be understood that intake nozzles or the like on the ends of the tubing 25 will always remain below the liquid level regardless of the orientation of the heliostat, and in this case in particular the inner support ring 16 thereof. How to accomplish this is certainly well within the knowledge of those of skill in the art. By pumping a ballast liquid between the tanks 23, 23, a gravitational moment can be actively created about either the first or the second axis of rotation, thus effecting rotation of the mirror 11 about that axis.

Figure 3:
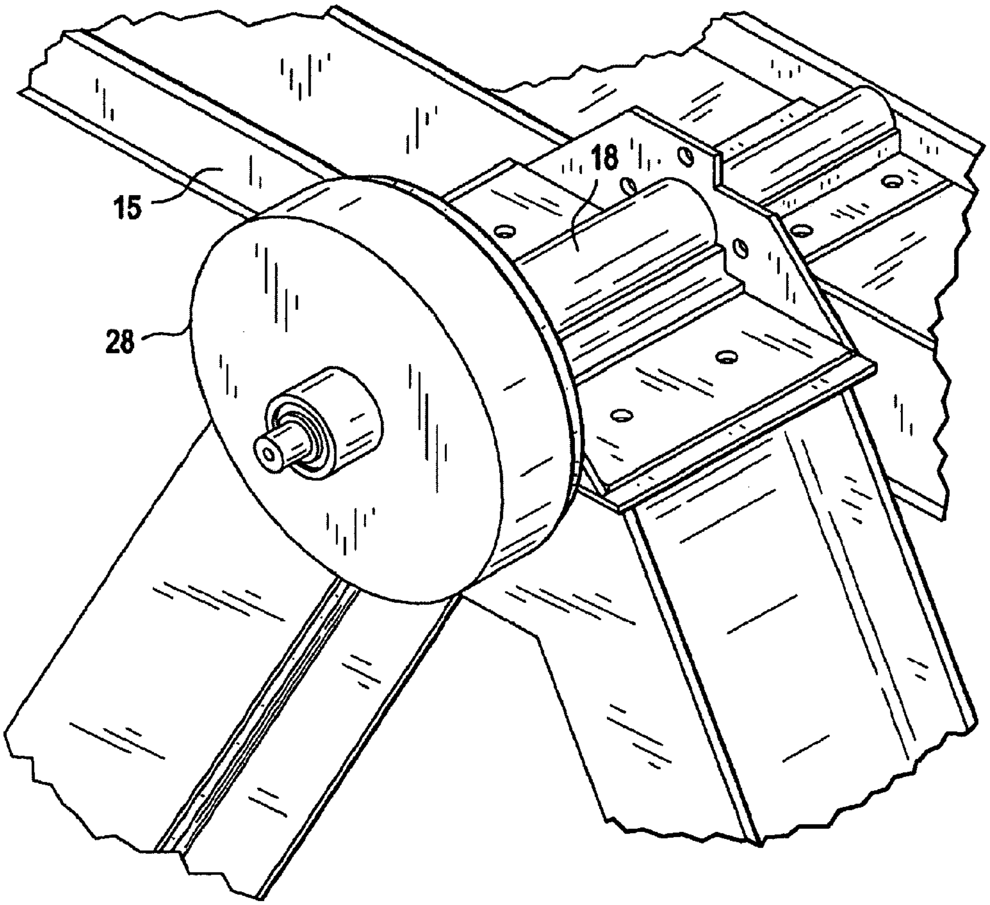
FIG. 3 shows a brake device of the heliostat of FIG. 1.

At least one of the rods or axles 18, 19 of each of the axes of rotation of the support rings 15 and 16 can be provided with a brake to allow the rod or axles 18, 19, and hence the associated support ring 15, 16, to be locked in place or to control excess rotation thereof, if desired. Such a brake 28 is illustrated by way of example in FIG. 3. Such brakes make it possible to achieve the tight accuracy requirements of the control system of applicants' heliostat. Although the specific type of brake is not critical to the design, it must of course be suitable for electronic control. In the illustrated embodiment, a hydraulic drum brake was utilized and is adapted to be activated by an electronically controlled hydraulic pump, as described subsequently in conjunction with the control system illustrated in FIG. 5.

Figure 4:
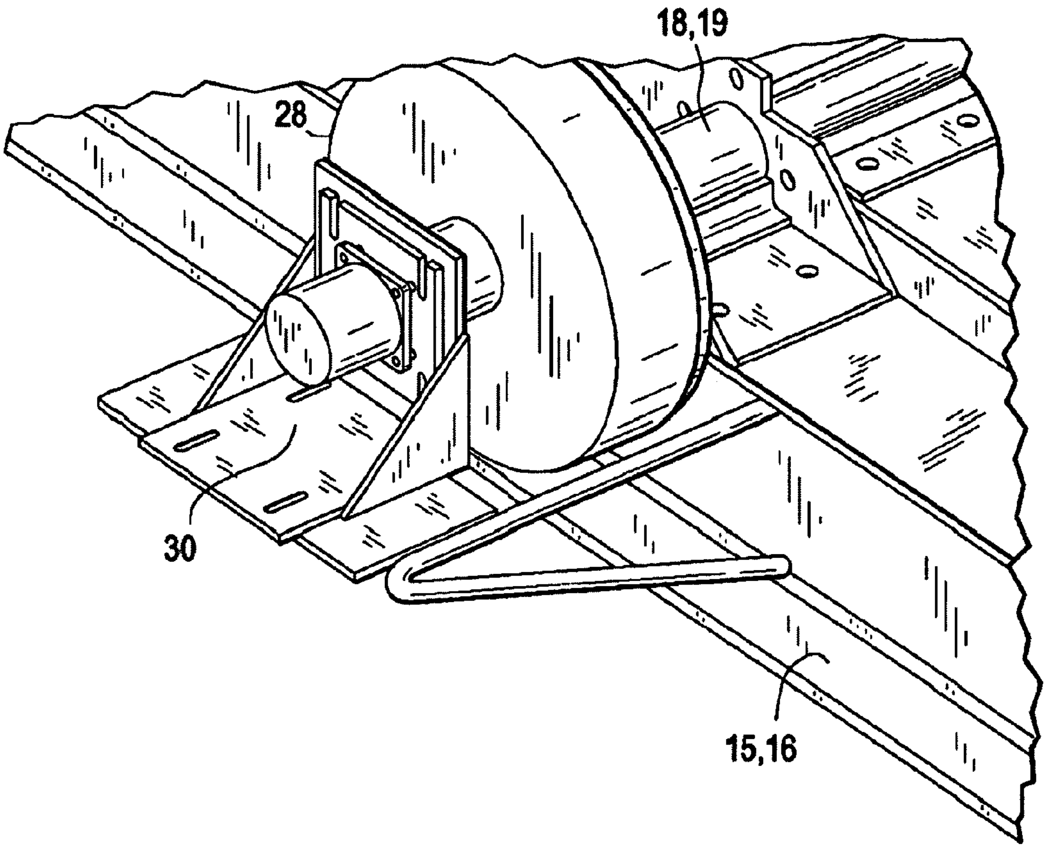
FIG. 4 shows an angular position sensor of the heliostat of FIG. 1.

FIG. 4 additionally illustrates the provision of an angular position sensor 30 on the rods or axles 18, 19 of the support rings 15, 16 for providing position information regarding the pertaining support ring. Again, the function and operation of the angular position sensors 30 will be described below in conjunction with the control system of FIG. 5.

Figure 5:
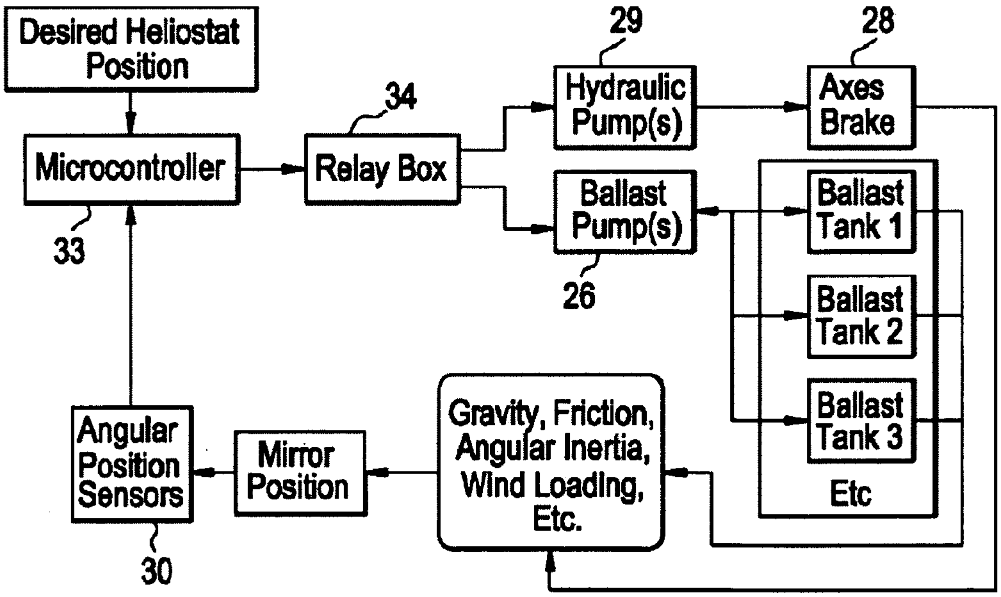
FIG. 5 is a flow diagram of a control system for the heliostat of FIG. 1.

Illustrated in FIG. 5 is a flow diagram for a control system for coordinating the flow of ballast liquid, as well as for controlling brakes and receiving sensor and other information, all for effecting proper positioning of the mirror 11. In general, the desired angular position of the heliostat is such that a vector normal to the surface of the mirror at its center points in the direction of the half-angle between the sun and a target onto which sunlight is being reflected. In certain cases, it might also be desired to orient the heliostat in a stow position so as to prevent damage in extreme weather conditions or to facilitate maintenance procedures. In either case, the desired heliostat position would take the form of an angular orientation on each of the axes of rotation of the support rings, 15, 16. Based on the desired heliostat position and the orientations read on each of the rods or axles, 18, 19 from the position sensors 30, the microcontroller 33 would determine which direction each of the support rings 15, 16 is to be rotated about its axis of rotation, and would send signals to a relay box 34 to switch the ballast pump or pumps 26 (FIG. 2*a*) and/or the hydraulic pump or pumps 29 of the axis brakes 28 (FIG. 3) on or off, redistributing ballast liquid among the tanks 22, 23 and activating or deactivating the axis brakes as needed.

Although in the embodiment described above two support rings 15, 16 have been described, the axes of rotation of which are perpendicular to one another, it would also be possible to only have a single support ring, or more than two supports rings, with each support ring having an axis of rotation that is disposed at an angle to the remaining axes of rotation. If a single support ring with only two tanks is provided, the imaginary line between the tanks can also be disposed at an angle other that perpendicular to the axis of rotation of the support ring. In addition, rather than each of the support rings being provided with a pair of ballast liquid tanks, with the exception of the first support ring the remaining support rings can be provided with only a single ballast liquid tank. In such a case, it could be advantageous for the paired tanks to be provided with multiple chambers in order to facilitate the action of the single tanks on the other support rings. Furthermore, although in the illustrated embodiment all four tanks were shown as being supported on the underside of the inner support ring 16, it would also be possible for the two tanks 22 to be supported on the outer support ring 15. In addition, the tanks 22, 23 are preferably equidistantly disposed from the pivot rods or axles 18, 19 that provide for the axes of rotation to which the imaginary lines between the pertaining tanks 23, 22 are perpendicular.

In the illustrated embodiment, the outer support ring 15 is shown as being square or rectangle, and the inner support ring 16 is shown as being octagonal. However, any other convenient shape would also be possible.

The heliostat 10 of the present invention, and in particular the frame structure 12 thereof, need not be built on site but can be mobile. However, in order to meet the accuracy requirements of a heliostat, the frame structure 12, and in particular the base 14 thereof, must be immobilized after installation. One cost-effective method, illustrated in FIGS. 1 and 2, is to provide the base 14 with a trough 36 that can then be filled with dirt, rocks, or any other weighted material. Alternative methods for immobilizing the frame structure 12 would include staking the base 14 with cables, bolting the base to a concrete slab or otherwise stabilizing the base.

The present invention is, of course, in no way restricted to the specific disclosure of the specification and drawings, but also encompasses any modifications within the scope of the appended claims.

We claim:

1. A heliostat, comprising:

a mirror (11);

a frame structure (12) for supporting said mirror (11), wherein said frame structure (12) is adapted to be pivotable about at least one axis of rotation;

a liquid ballast system (20) mounted on a side of said frame structure (12) that is remote from a reflective surface of said mirror (11), wherein said liquid ballast system (20) is comprised of at least two tanks (22; 23), wherein said frame structure (12) includes a first support ring (15) that is pivotable about a first axis of rotation, and a second support ring (16) for supporting said mirror (11), further wherein said second support ring (16) is pivotably supported on said first support ring (15) so as to be pivotable about a second axis of rotation that is perpendicular to said first axis of rotation, further wherein said liquid ballast system (20) is mounted on a side of said second support ring (16) that is remote from the reflective surface of said mirror (11), further wherein said liquid ballast system (20) is comprised of four tanks (22, 23), further wherein an imaginary line between one pair of opposing tanks (22) is perpendicular to said first axis of rotation, and wherein a further imaginary line between the other pair of opposing tanks (23) is perpendicular to said second axis of rotation; and an electronically controllable pump system for moving ballast liquid between said at least two tanks (22; 23) in an actively controlled manner.

2. A heliostat, according to claim 1, wherein an imaginary line between said at least two tanks (22; 23) extends at an angle to said at least one axis of rotation.

3. A heliostat according to claim 2, wherein an imaginary line between said at least two tanks is perpendicular to said at least one axis of rotation.

4. A heliostat comprising:

a mirror (11);

a frame structure (12) for supporting said mirror (11), wherein said frame structure (12) is adapted to be pivotable about at least one axis of rotation wherein said frame structure (12) I further includes a base (14), and wherein a first support ring (15) is pivotably supported on said base (14) so as to be pivotable about a first axis of rotation, wherein said frame structure (12) further includes a base (14), and wherein a first support ring (15) is pivotably supported on said base (14) so as to be pivotable about a first axis of rotation;

a liquid ballast system (20) mounted on a side of said frame structure (12) that is remote from a reflective surface of said mirror (11), wherein said liquid ballast system (20) is comprised of at least two tanks (22; 23); and an electronically controllable pump system for moving ballast liquid between said at least two tanks (22; 23) in an actively controlled manner.

5. A heliostat comprising:

a mirror (11);

a frame structure (12) for supporting said mirror (11), wherein said frame structure (12) is adapted to be pivotable about at least one axis of rotation;

a liquid ballast system (20) mounted on a side of said frame structure (12) that is remote from a reflective surface of said mirror (11), wherein said liquid ballast system (20) is comprised of at least two tanks (22; 23), wherein said frame structure (12) includes a first support ring (15) that is pivotable about a first axis of rotation, and a second support ring (16) for supporting said mirror (11), further wherein said second support ring (16) is pivotably supported on said first support ring (15) so as to be pivotable about a second axis of rotation that is perpendicular to said first axis of rotation, further wherein said liquid ballast system is mounted on a side of said second support ring (16) that is remote from the reflective surface of said mirror (11), and wherein said liquid ballast system (20) is comprised of three tanks (22; 23); and an electronically controllable pump system for moving ballast liquid between said at least two tanks (22; 23) in an actively controlled manner.

6. A heliostat according to claim 5, wherein an imaginary line between one pair of opposing tanks (23) is perpendicular to said second axis of rotation, and wherein a third tank (22) is disposed in a plane containing said second axis of rotation.

7. A heliostat according to claim 4, wherein said first support ring (15) is pivotably supported on said base (14) of said frame structure (12) via axles or rods (18), and wherein said second support ring (16) is pivotably supported on said first support ring (15) via axles or rods (19).

8. A heliostat according to claim 7, wherein respective brake devices (28) are disposed on at least one of said axles or rods (18, 19).

9. A heliostat according to claim 4, which includes angular position sensors (30) for sensing the positions of said first and second support rings (15, 16).

10. A heliostat according to claim 7, wherein said imaginary lines between said tanks (22, 23) extend equidistantly between said axles or rods (18, 19) of said first and second support rings (15, 16).

11. A heliostat according to claim 1, wherein said first and second support rings (15, 16) have any desired shape.

12. A heliostat according to claim 11, wherein said first support ring (15) has a square or rectangular configuration, and wherein said second support ring (16) has an octagonal configuration.

13. A heliostat according to claim 4, wherein said base (14) of said frame structure (12) is provided with a trough (36) for receiving weighting material to immobilize said base.

14. A heliostat, comprising:

a mirror (11);

a frame structure (12) for supporting said mirror (11), wherein said frame structure (12) is adapted to be pivotable about at least one axis of rotation:

a liquid ballast system (20) mounted on a side of said frame structure (12) that is remote from a reflective surface of said mirror (11), wherein said liquid ballast system (20) is comprised of at least two tanks (22; 23): and an electronically controllable pump system for moving ballast liquid between said at least two tanks (22; 23) in an actively controlled manner, wherein said pump system for moving ballast liquid between said tanks includes conduits (25) connecting said tanks (22, 23) of said pairs of tanks, ballast pump means (26) disposed in said conduits (25), and a microcontroller (33) for effecting electronic control of said ballast pump means (26).

15. A heliostat according to claim 14, wherein said microcontroller (33) is adapted to activate said pump means (26) in response to at least one of the parameters of the group consisting of a desired mirror position, an actual mirror position, and weather and environmental conditions.

16. A heliostat according to claim 15, which includes brake devices (28) for pivot means (18, 19) of said frame structure (12), wherein said controller (33) is further adapted to activate or deactivate said brake devices (28).

17. A heliostat according to claim 14, which further comprises at least one angular position sensor (30) for sensing the position of said frame structure (12), wherein said microcontroller (33) is interposed between said position sensor (30) and said ballast pump means (26).

* * * * *